United States Patent [19]
Kita

[11] 3,723,854
[45] Mar. 27, 1973

[54] CIRCUIT FOR COMPENSATING FOR LINE DROP BETWEEN POWER SOURCE AND LOAD CIRCUIT

[75] Inventor: Hiroshi Kita, Japan

[73] Assignee: New Nippon Electric Company, Ltd., Osaka, Japan

[22] Filed: Aug. 9, 1971

[21] Appl. No.: 170,057

[30] Foreign Application Priority Data

Sept. 2, 1970 Japan .................................45/77288

[52] U.S. Cl. .....................323/20, 315/189, 315/194, 323/22 SC, 323/24, 307/252 T
[51] Int. Cl. ..............................G05f 1/44, H02h 3/08
[58] Field of Search ...323/22 T, 22 SC, 24, 20, 89 R; 315/189, 194; 330/101, 104; 307/252 B, 252 T

[56] References Cited

UNITED STATES PATENTS

| | | |
|---|---|---|
| 3,335,318 | 8/1967 | Yancey .............................315/194 |
| 3,200,327 | 10/1965 | Fleming ...............................323/89 R |
| 3,577,035 | 5/1971 | Constable...........................323/20 X |
| 3,538,418 | 11/1970 | Allington..............................323/20 |
| 3,414,766 | 12/1968 | Miller....................................315/194 |
| 3,596,170 | 7/1971 | Moriyasu et al. ...................323/22 T |

*Primary Examiner*—Gerald Goldberg
*Attorney*—W. G. Fasse

[57] ABSTRACT

A load is energized from an alternating current source by way of a conduction angle control circuit controlled by a phase control circuit. A detected signal proportional to the load current is positively fed back to the conduction angle control circuit to automatically compensate for the voltage drops in the power feed path for the load. A protecting circuit may be connected to generate a negative signal when the supply voltage exceeds a determined value with respect to the normal load current due to the capacity of the load.

12 Claims, 5 Drawing Figures

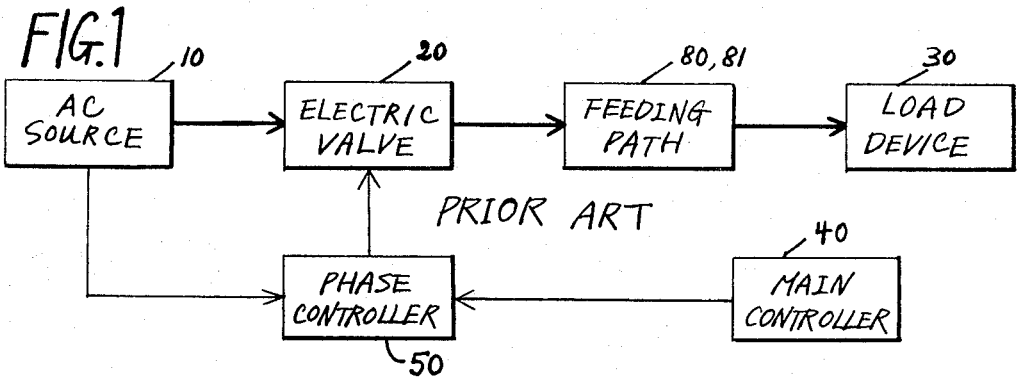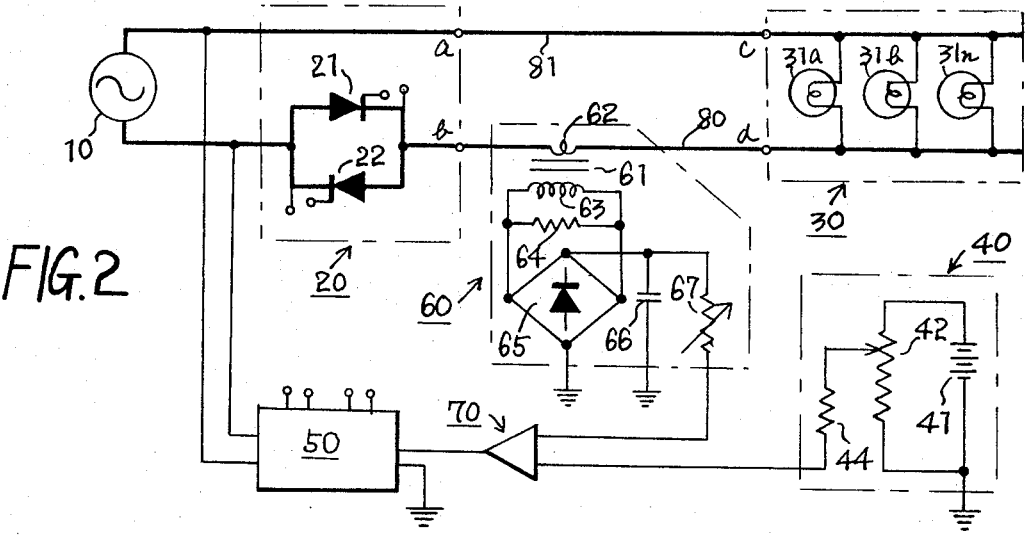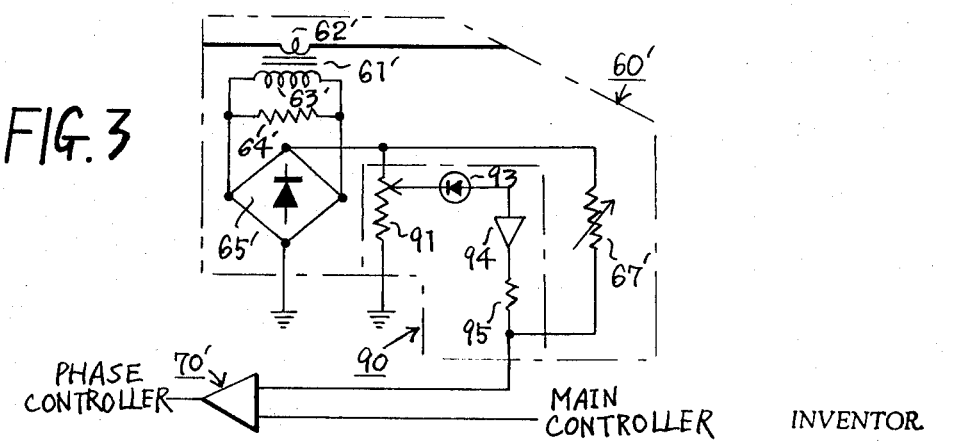

INVENTOR.
HIROSHI KITA
BY G.G. Fasse
Atty.

CIRCUIT FOR COMPENSATING FOR LINE DROP BETWEEN POWER SOURCE AND LOAD CIRCUIT

BACKGROUND OF THE INVENTION

1. Field of the Invention

This invention relates to a power regulating device having an electric valve for controlling the conduction angle in supplying power to a load device such as a motor, heater, electric lamp or the like, and more particularly to an improved circuit for regulating the supply of power in which the voltage drops in feeding cables connected to the load device can be automatically compensated by a positive type feedback.

2. Prior Art

Generally, a conventional power regulating device is used for an adjustable load device, for example, a dimmer for adjusting lighting in the theater or TV studios. One such arrangement is shown in the U.S. Pat. No. 3,525,015, issued to Hiroshi Kita, on Aug. 18, 1970 and assigned to the same assignee as this invention.

In such conventional dimmer, power supplied to the load such as an incandescent lamp is regulated by an electric valve such as silicon controlled rectifiers connected in parallel reverse relation to alternately pass a load current supplied by an alternating current source, and the electric valve is controlled through a phase controller by means of the potentiometer in a dimming control panel by which a desired signal voltage is produced. However, the feeding path between the output terminals of the electric valve and the input terminals of the load causes some degree of voltage drop in proportion to the current of the load, and the variation of the voltage drop provides undesired effects for dimming characteristics. This effect is significant when a comparatively long feeding path is used in places such as a grand theater and TV studios where a number of control circuits is installed for obtaining complex dimming effects, and where a small diameter of the cable is required for each feeding path. Therefore, the problem of voltage variation due to the voltage drop has been important for installing power regulating means in such field, and a solution of the problem in this field has long been awaited.

SUMMARY OF THE INVENTION

In accordance with one aspect of this invention, a power regulating circuit is provided having an electric valve and a phase controller for controlling the conduction angle of an alternating current supplied to a load. A load current detector is also provided for adding a detected signal derived from the load current, to a desired signal from a main controller. Since a pulse output generated by the phase controller in response to both of the detected signal and the desired signal, is applied to the electric valve, the power supplied to the load is automatically regulated so that it is not influenced by voltage drops in the feeding path. In other words, the value of the positive feedback signal to increase the power supply to the load is varied in accordance with the load current which causes the feeder voltage drop.

In accordance with an additional aspect of this invention a system of protection for circuit elements is provided. In this system circuit element protecting means is added to the load current detector, such as by incorporating a negative signal generator therein. The circuit element protecting means include a potentiometer, polarity reversing means and an element which switches to a conductive state when a predetermined voltage is applied thereto, such as a Zener diode. The system is operated in response to an abnormal condition, that is, when the detected signal under an abnormal condition is in excess of the signal detected when normal conditions exist in the system.

Each of the above-mentioned power regulating circuit can be applied to a lamp dimmer circuit of the type having differentially connecting means for feedbacking a signal in proportion to the power of alternating current supply to the lamp load, in order to automatically control undesired illuminant variation due to the power source and to automatically compensate voltage drop in feeding path.

BRIEF DESCRIPTION OF THE DRAWINGS

In order that the invention may be clearly understood, it will now be described, by the way of example, with reference to the accompanying drawings, wherein:

FIG. 1 is a block diagram of the conventional power regulating device;

FIG. 2 is a principal circuit diagram of a dimmer according to this invention;

FIG. 3 is a modified circuit of the load current detector of FIG. 2, in which only the detector circuit is shown in detail;

DETAILED DESCRIPTION OF PREFERRED EMBODIMENTS

Figure 4:
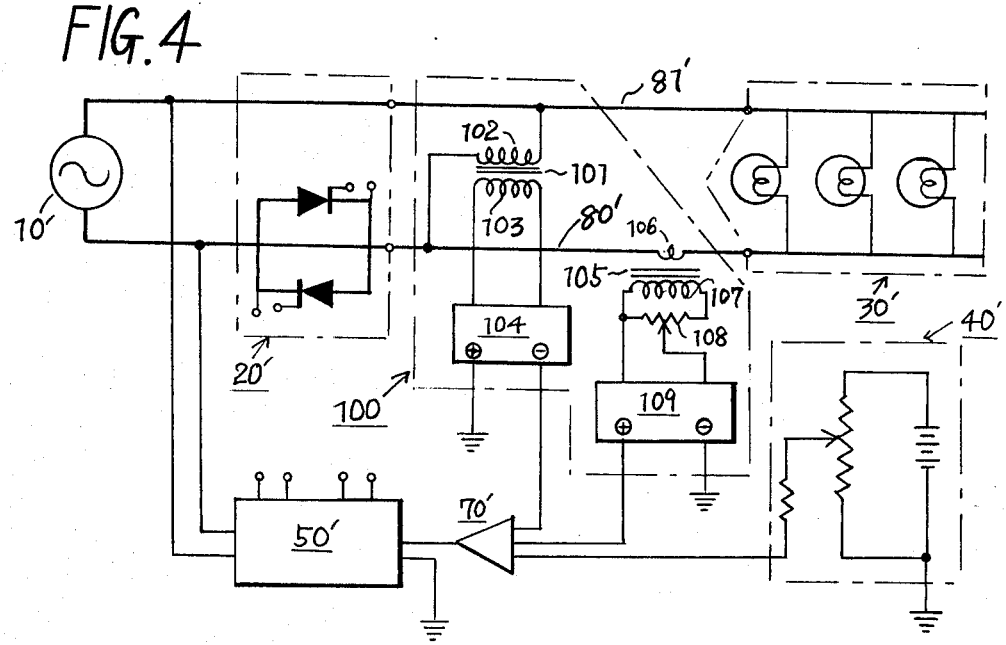
FIG. 4 is a circuit diagram of another embodiment of this invention, in which a feedback circuit produces two types of feedback signals

The principles of this invention are applicable to any type of dimmer and also to any type of load device which utilizes an electrical load such as a motor, heater or the like. In contrast to the conventional device as shown in FIG. 1, main portions of embodiments of this invention are surrounded by dashed-line blocks as shown in FIGS. 2 to 5. The circuit of FIG. 1 is conventional, and hence a detailed description is not believed to be necessary. Briefly stated, however, current from an A.C. source 10 is applied to a load circuit 30 by way of an electric valve control circuit 20 and feed lines indicated by feed path 80,81. The circuit 20 is controlled by a phase controller 50 which may be a gate pulse generator, and the controller 50 is manually or automatically controlled by a main controller 40. A typical phase controller, which may be employed in the present system, is shown for example in U.S. Pat. No. 3,525,015.

Referring now to FIG. 2, a dimmer circuit of this invention is illustrated, which is comprised of a power supplying line having an alternating current source 10, an electric valve 20 and a load 30, and a control line having a signal generator 40, a phase controller 50, a load detector 60 and an adder 70. Output terminals (a) and (b) of the electric valve 20 (which may be comprised of silicon controlled rectifiers connected in parallel inverse relation) are connected respectively by means of feeding path such as cables 80 and 81 with input terminals (c) and (d) of the load 30 of incandescent lamps 31a, 31b, and 31n. The signal generator 70 includes a direct current source 41, a potentiometer 42, and a resistor 44. One terminal of resistor 44 is grounded, and the other terminal is connected to the adder 70 together with one of the output terminals of the load current detector 60. The load current detector 60 includes a current transformer 61 having a primary winding 62 coupled to the path 80 and a secondary winding 63, a resistor 64 in parallel with the secondary winding 63, a full wave rectifier 65, and a variable resistor 67 from which the detected signal output is applied to the adder 70 so as to produce a mixed signal of the desired and detected signals. The other of the output terminals of the load current detector 60 is grounded. A smoothing condenser 66 is connected in parallel with the rectifier 65. It is possible to use a potentiometer instead of the resistor 64 so as to obtain the same effects as with the variable resistor 67.

In the above-mentioned circuit, when a signal voltage is first produced by the potentiometer 42, a gate pulse is generated by the phase controller 50 in response to the value of the signal voltage for controlling the conduction angle of the electric valve 20, thereby dimming the lighted lamps of the load 30. When a voltage corresponding to the load current passing through the primary winding 62 appears in the secondary winding 63 of the current transformer 61, the detected voltage is rectified by the full wave rectifier 65 and applied to the adder 70 by way of the variable resistor 67. Accordingly, the sum of signals from the signal generator 40 and the load detector 60 is applied to the phase controller 50 so as to increase the conduction angle of the electric valve 20. Thus, the voltage drop caused in the cables 80 and 81 can be automatically compensated, and a desired dimming is accomplished in this circuit arrangement.

In the prior art systems in which the load is only increased under the condition of maintaining the signal voltage from the signal generator 40 constant, lighting of the lamps of the load in the conventional system is generally variable in accordance with the voltage drop due to the increased load current in the cables. In the present invention, however, a feedback signal from the detector 60 is added to compensate for such voltage drop by increasing the conduction angle of the electric valve 20. In the circuit of this embodiment the resistance value of the variable resistor 67 of the detector 60 is determined by resistance of the feeding path, such as the length and diameter of the cables 80 and 81. For instance, where the voltage drop is relatively large due to a long length of the cables, a small value of resistance is selected for effectively back-feeding the detected signal, and where the voltage drop is small due to the use of short cable, a large value of resistance is selected to diminish the feedback signal thereby so that the proper relation between the signal voltage and the detected voltage is established for the adder 70.

In FIG. 3, another embodiment of this invention is illustrated for protecting circuit elements from damages by an overload. In this embodiment overload preventing means 90 is also associated with the load current detector 60, so as to connect the variable resistor 67 in parallel with the means 90. The overload preventing means 90 comprises a potentiometer 91, an element having a particular conduction characteristic to an applied voltage, such as a Zener diode 93, polarity reversing means such as an inverter 94, and a resistor 95. If the circuit state corresponds to an overload condition or if some lamps of the load are short circuited by accident, a relatively high voltage is detected by the current transformer 61 of the detector 60 as a positive type of feedback, and then the overload preventing means 90 is timely operated to diminish the voltage of positive feedback due to generation of a negative signal generated by, the cooperation of establishing the conduction state of the Zener diode 93 and the reversed polarity effect of the polarity inverter 94. That is, a negative feedback together with the positive feedback from the relatively high detected voltage, is applied to the adder 70.

The gain of the negative feedback is usually determined by the resistor 95. While the resistance value of the resistor 95 controlling the gain of the negative feedback is significantly smaller than the resistance value of the variable resistor 67 which controls the gain of the positive feedback, the negative feedback is primarily employed only for controlling the conduction angle of the electric valve 20, when an excess of the positive feedback signal is detected.

The operational point of the overload preventing means 90 is determined by the potentiometer 91. Thus, by associating the protecting means 90 with the load current detector 60, the electric valve and other elements in the power supplying line are protected from damages due to the overcurrent or overload.

In FIG. 4, a further embodiment with a feedback circuit comprises a load current detector as positive feedback means and a power supply voltage detector as negative feedback means. Except for the feedback circuit 100, the other circuit components used in this circuit diagram are similar to those of the embodiment of FIG. 2 so that corresponding elements of the circuit of FIG. 4 are denoted with the same reference numerals, but provided with a'''''.

In the feedback circuit 100 of FIG. 4, the negative feedback means include a transformer 101 with primary and secondary windings 102 and 103 and rectifying means 104. The primary winding 102 of the transformer is interposed between feeding cables 80' and 81' so that the detected line voltage which appears in the secondary winding 103 may be rectified and differentially applied to an adder 70'. Thus, a negative feedback is achieved for automatically controlling the supply of current to the load 30'.

The load current detector for the positive feedback includes a current transformer 105 with primary and secondary windings 106 and 107, a potentiometer 108 and a rectifying means 109. The positive feedback is accomplished in the same manner as described with reference to the load current detector 60 of FIG. 2. Therefore, a mixed signal of negative and positive feedback signals and a main signal from a main controller 40' is produced at the adder 70' and applied to a phase controller 50'. In this circuit, the potentiometer 108 determines a value of the positive feedback voltage in the same manner as the variable resistor 67 of FIG. 2.

Figure 5:
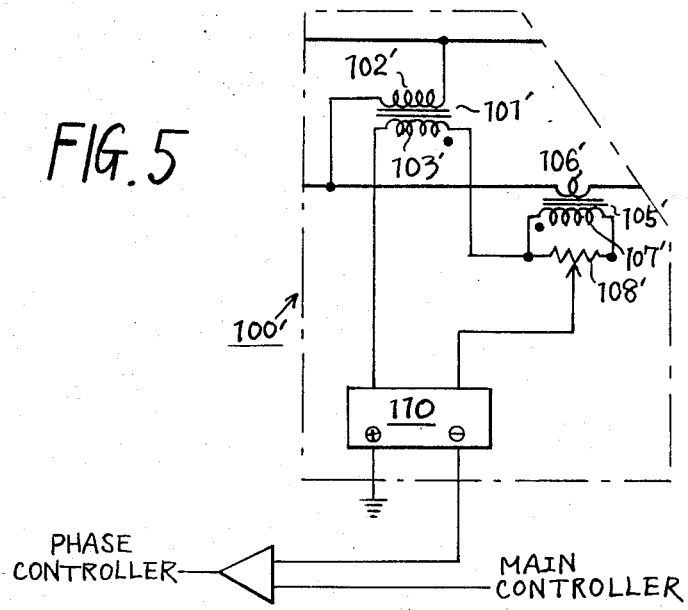
FIG. 5 is a modified circuit of the feedback circuit of FIG. 4.

A modified feedback circuit 100' shown in FIG. 5, wherein a single rectifier 110 is effectively used by coupling the secondary winding 103' of the voltage-transformer 101' and the secondary winding 107' of the current-transformer 105' in reverse polarity to each other. Accordingly, a difference voltage of detected signals appears in the secondary windings 103' and 107' and is rectified. The rectified signal is applied to the adder 70' together with a main signal from the main controller. The overload preventing means 90 described with reference to FIG. 3 may be applicable to these embodiments.

While the above specification describes and the accompanying drawings show what is at present considered the preferred embodiment of the invention, it is to be understood that it is intended to cover all modifications and equivalents within the scope of the appended claims.

What I claim is:

1. A system for regulating the energization of a load from an alternating current supply source, wherein said supply source is connected to said load through a current control device and a feedpath having a substantial resistance in that order, said system comprising conduction angle control means connected to said control device for controlling current applied to said load, a control current source, means coupled to said feedpath for deriving a signal proportional to said load current, means for applying the sum of said control current and said derived signal to said conduction angle control means for controlling said current, said signal being applied to said control means in the positive feedback sense whereby said current is increased in a sense to compensate for voltage drops in said feedpath, and means connected to said means for deriving said signal for adding an opposing signal to the output of said signal deriving means when said current exceeds a given magnitude.

2. The system of claim 1, wherein said means for deriving said signal comprises a single current transformer coupled to said feedpath, and rectifier means coupled to the output of said transformer to produce said derived signal.

3. The system of claim 2, wherein said means for deriving said signal further comprises a variable resistor connected to the output of said rectifier means for adjusting the amplitude of said signal with respect to the value of resistance of said feedpath.

4. The system of claim 3, wherein said means for adding an opposing signal further comprises a potentiometer connected between terminals of the output of said rectifier for adjusting the operation point of said means for adding an opposing signal.

5. The system of claim 2, wherein said means for deriving said signal further comprises a variable resistor connected to the output of said current transformer for adjusting the amplitude of said signal with respect to the value of resistance of said feedpath.

6. The system of claim 5, wherein said means for adding an opposing signal further comprises a potentiometer connected between terminals of the output of said rectifier for adjusting the operation point of said means for adding an opposing signal.

7. The system of claim 1, wherein said signal deriving means comprises a single current transformer coupled to said feedpath, rectifier means coupled to the output of said transformer, and a series resistor connected to the output of said rectifier means, and said means for adding an opposing signal comprises a threshold device and an inverter serially connected between the output of said rectifier means and the output of said signal deriving means.

8. The system of claim 7, further comprising resistor means serially connected with said inverter and said threshold device.

9. The system according to claim 1, further comprising negative feedback means for controlling variations of supply of current to said load, said negative feedback means producing a signal which is proportional to the alternating current supplied to the load, means for differentially adding said proportional signal to said derived signal from said signal deriving means and to said control current from said control current source.

10. A dimmer circuit comprising an alternating current source, a lighting load device, conduction angle control means for regulating alternating current to said load device from said alternating current source, power feeding means for said load device, and a feedback circuit having a load current detector for detecting a first signal corresponding to the current of said load device and a second detector for detecting a second signal corresponding to the voltage of said source, said first signal from said load current detector being positively fedback to said conduction angle control means, and said second signal from said second detector being negatively fedback to said conduction angle control means, thereby compensating voltage drops in said power feeding means and controlling illuminant variations in said load device.

11. The dimmer circuit according to claim 10, wherein said load current detector includes a current transformer, a rectifier and a resistor the resistance of which is predetermined by said power feeding means, and wherein said second detector includes a rectifier and a transformer for detecting the line voltage of said alternating current source.

12. The dimmer circuit according to claim 10, wherein said feedback circuit comprises a current transformer having primary and secondary windings, a voltage transformer having primary and secondary windings, said secondary windings being connected in series with each other in the manner of reverse polarity, and wherein a single rectifier is provided for obtaining a direct current feedback signal from said first and second signals detected by said current transformer and said voltage transformer.

* * * * *